March 18, 1924.  
J. BOHLI  
FRICTION CLUTCH  
Filed Dec. 22, 1922  
1,487,010

Inventor:  
J. Bohli  
By Marks & Clerk  
Atty's

Patented Mar. 18, 1924.

1,487,010

UNITED STATES PATENT OFFICE.

JACQUES BOHLI, OF SOLOTHURN, SWITZERLAND, ASSIGNOR TO THE FIRM SCINTILLA, OF SOLOTHURN, SWITZERLAND.

FRICTION CLUTCH.

Application filed December 22, 1922. Serial No. 608,551.

*To all whom it may concern:*

Be it known that I, JACQUES BOHLI, a citizen of the Swiss Republic, residing at 304, Obach, Solothurn, Switzerland, have invented certain new and useful Improvements in Friction Clutches, of which the following is a specification.

This invention has for its object to provide an improved friction clutch for short periods of working. This improved friction clutch has the advantage of being safer and more reliable in working than other clutches of this type.

The friction clutches usually employed, such as the cone clutch, the steel lamination clutch, etc., all have the drawback that even the slightest quantity of oil penetrating into the same has an injurious effect upon their action.

In some cases it is however not possible to protect those known clutches permanently from the penetration of lubricating oil. In the steel lamination clutch the injurious influence of the oil consists mainly in rendering the lamellæ very liable to adhere together, so that it is often not possible to effect a proper unclutching, whereas both in the steel lamination clutch and the cone clutch the friction is greatly reduced by oil so that a much greater axial pressure has to be exerted for the purpose of transmitting the desired power through those types of clutches. As a matter of fact it has been found that the footstep bearing or thrust bearings of such clutches are deteriorated by the high axial pressure.

An improved clutch according to the present invention is free from those drawbacks. An essential feature of its construction consists in a normal roller or ball bearing whereof only the balls are driven positively and are carried along idly in the open condition of the clutch, whereas the closing of the clutch for the transmission of power is effected by exerting pressure in the axial direction upon one ring of the two ball bearing rings, whereby said ring is shifted axially in relation to the other ring to such an extent as will cause jamming of the balls, whereupon the two rings, together with the parts, combined with those rings and combined with one another, are carried along by the driving shaft owing to the friction generated by the exerted axial pressure.

A constructional example of an improved friction clutch according to this invention is illustrated in the accompanying drawings in which:—

In the illustrated embodiment of this invention, the ball-driving member $b$ has the form of a ball cage fixed on the driving shaft $a$. This ball cage $b$ is made in one piece having the shape of a disc provided on one side with axially longitudinal projections $c$ arranged at equal distances apart with their lateral boundary surfaces contoured to the shape of the balls $k$.

The member $b$ may be made for instance by forming the disc at first with an annular rim on one side, into which apertures of a size corresponding to the diameter of the balls are then drilled axially at equal distances apart. In these apertures the balls $k$ are located loose, and in the open condition of the clutch they touch lightly the inner and outer ball-bearing rings. The outer ball-bearing ring $d$ is pressed immovably into the driven clutch element $e$, whereas the inner ball-bearing ring $f$ is fixed on a loose piece $g$ which has the shape of a disc provided on one side with a circular central neck for the reception of the inner ball-bearing ring $f$. This disc $g$ is formed on its periphery with a projection $s$ which engages in a longitudinal slot $t$ in the driven clutch element $e$ in such a manner that both parts must hold together and must revolve positively with one another, while remaining longitudinally adjustable relatively to each other in the direction parallel to their common axis of rotation.

The carrier $g$ of the inner ball-bearing ring is held in its central position both by means of its periphery fitted into the cylindrical aperture of the driven clutch element $e$ and by being centered by the balls themselves.

The driven clutch element $e$ is readily adjustable to and fro in the axial direction. It is mounted on the outer surface of the fixed bearing body $h$, and also on a cylindrical shoulder on the inner side of the cover $i$ of the bearing casing. The axial pressure is taken by a screw $l$.

The operation of the improved clutch is as follows:—

In its open condition (shown in Figure 1) the balls $k$ are quite free because they are not acted upon by any pressure from any side. By overcoming a very small frictional resistance they are carried round positively by the driving shaft $a$ by means of the driver $b$ which is constructed in the form of a ball cage; the two parts $e$ and $g$, together with the rings $d$ and $f$, remaining stationary.

Figure 1:
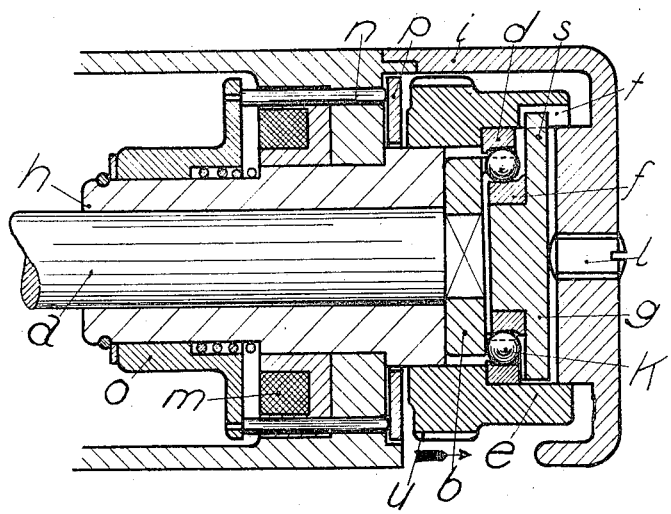
Figure 1 is a longitudinal section of the improved clutch in its open condition.
Figure 2:
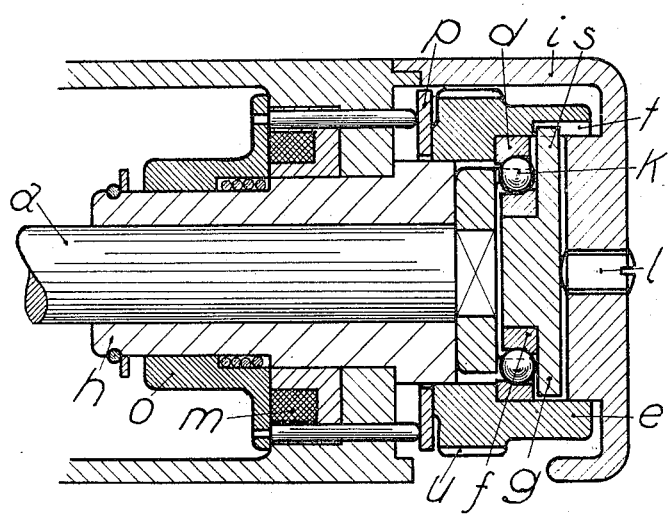
Figure 2 is a longitudinal section of the said clutch in the closed condition.
Figure 3:
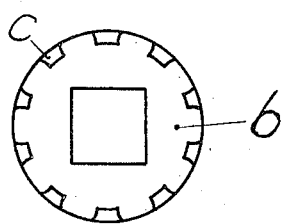
Figure 3 is a front view of the ball-driving member hereinafter described.
Figure 4:
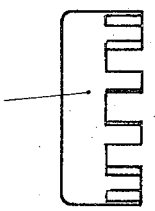
Figure 4 is a side view thereof.

When the clutch is to be closed (Fig. 2) pressure must be exerted upon the part $e$ in order that the said part shall move axially in the direction of the arrow (Fig. 1). In this manner the balls $k$ are jammed between the rings $d$ and $f$ which are shaped on their inner surfaces to conform with the curvature of said balls, and these rings as well as the parts $g$ and $e$ that engage said rings and also engage one another, are carried round by the driving shaft $a$. The power of the driving shaft $a$ can then be transmitted for instance by means of teeth $u$ formed on the part $e$, to any desired further point.

The pressure serving to produce the coupling together of the driving and driven clutch elements may also be exerted upon the clutch element $e$, electro-magnetically. For this purpose an annular magnetic coil $m$ is arranged round the shaft $a$. By the magnetic excitation of this coil a flange $o$ carrying pins $n$ is attracted. The pins $n$ extend through the shaft bearing body and press against the loose disc $p$ which in its turn exerts upon the driven clutch element $e$ the pressure required for closing the clutch.

What I claim is:—

1. In a friction clutch for short periods of working, the combination with a rotary driving shaft, of a rotary driving clutch element connected thereto, an axially slidable rotary driven clutch element, an axially slidable rotary ball bearing ring, a non-slidable rotary ball bearing ring, balls located between said two ball-bearing rings, and positive driving means for carrying said balls round idly so long as the clutch is open, whereas by applying axially directed pressure to said axially slidable clutch element, said axially slidable ball-bearing ring will be caused to slide and jam said balls against said non-slidable ball bearing ring, whereby said two rings and said balls and said driven clutch element will be carried round by the driving shaft, thus closing the clutch.

2. In a friction clutch for short periods of working, the combination with a rotary driving shaft, of a rotary driving clutch element connected thereto, an axially slidable rotary driven clutch element, an axially slidable rotary ball-bearing ring connected to said driven clutch element, a non-slidable rotary ball-bearing ring, also connected to said driven clutch element, balls located between said two ball-bearing rings, and a driving member fixed on the driving shaft, for engaging said balls and driving them round positively while the clutch is open and also while the clutch is closed, the connection between said two rings and said driven clutch element being such that said two rings are independent of each other as regards axial motion, while being capable of rotating together.

3. In a friction clutch for short periods of working, the combination with a rotary driving shaft, of a rotary driving clutch element connected thereto, an axially slidable rotary driven clutch element, an axially slidable rotary ball-bearing ring, a non-slidable rotary ball-bearing ring, balls located between said two ball-bearing rings, positive driving means for carrying said balls round when the clutch is open and also when the clutch is closed, and an electro-magnetic device for causing said axially slidable driven clutch element to slide axially and cause said axially slidable ball-bearing ring to slide and thus jam said balls against said non-slidable ball-bearing ring and thereby close the clutch.

In testimony whereof I have signed my name to this specification.

JACQUES BOHLI.